(12) United States Patent
Brophy et al.

(10) Patent No.: US 6,275,623 B1
(45) Date of Patent: Aug. 14, 2001

(54) DYNAMICALLY CONFIGURABLE SPECTRAL FILTER

(75) Inventors: Christopher P. Brophy, Corning; Yongqian Liu, Painted Post; Peter G. Wigley, Corning, all of NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/351,590

(22) Filed: Jul. 12, 1999

(51) Int. Cl.[7] .............................. G02B 6/12; H04J 14/00
(52) U.S. Cl. ................... 385/14; 385/15; 385/11; 385/31; 385/37; 385/1; 359/115; 359/117; 359/124; 359/128; 359/130
(58) Field of Search .................. 385/11, 14, 31, 385/37, 42, 33, 39, 15, 16, 1, 2, 10; 359/115, 117, 122, 124, 128, 130, 139

(56) References Cited

U.S. PATENT DOCUMENTS

| | | | |
|---|---|---|---|
| 4,655,547 | 4/1987 | Heritage | 359/124 |
| 4,715,027 | 12/1987 | Mahapatra et al. | 359/130 X |
| 4,746,193 | 5/1988 | Heritage et al. | 359/124 |
| 4,866,699 | 9/1989 | Brackett et al. | 359/130 |
| 4,928,316 | 5/1990 | Heritage et al. | 359/124 |
| 5,132,824 | 7/1992 | Patel et al. | 359/78 |
| 5,341,444 * | 8/1994 | Henry et al. | 385/11 |
| 5,355,237 * | 10/1994 | Lang et al. | 359/130 |
| 5,400,418 | 3/1995 | Pearson et al. | 385/11 |
| 5,414,540 | 5/1995 | Patel et al. | 359/39 |
| 5,526,171 | 6/1996 | Warren | 359/285 |
| 5,574,596 | 11/1996 | Cheng | 359/484 |
| 5,623,571 * | 4/1997 | Chou et al. | 385/130 |
| 5,629,992 * | 5/1997 | Amersfoort et al. | 385/15 |
| 5,661,825 * | 8/1997 | Van Dam et al. | 385/11 |
| 5,687,262 * | 11/1997 | Buchin | 385/24 |
| 5,689,361 | 11/1997 | Damen et al. | 359/284 |
| 5,745,271 | 4/1998 | Ford et al. | 359/130 |
| 5,892,612 * | 4/1999 | Miller et al. | 359/250 |
| 5,926,587 * | 7/1999 | Chen et al. | 385/14 |

FOREIGN PATENT DOCUMENTS

| | | | |
|---|---|---|---|
| 654 917 A2 | 5/1995 | (EP) | 359/130 X |
| 826 989 A2 | 3/1998 | (EP) | 359/130 X |
| 96/41436 | 12/1996 | (WO) | 359/130 X |
| 98/35251 | 8/1998 | (WO) | 359/130 X |

OTHER PUBLICATIONS

Trigg, George, ed. *Encyclopedia of Applied Physics, vol. 9: Magnetic Materials to Mechanical Vibration and Damping.* New York; VCH Publishers, 1994. pp. 168–170, 187.

Ford, Joseph and Walker, James. "Dynamic Spectral Power Equalization Using Micro–Opto–Mechanics." *IEEE Photonics Technology Letters.* vol. 10, No. 10. Oct. 1998. pp. 1440–1442.

* cited by examiner

*Primary Examiner*—Brian Healy
(74) *Attorney, Agent, or Firm*—Eugene Stephens & Associates; Thomas B. Ryan

(57) ABSTRACT

Wavelength dispersion and spatial light modulation are combined having regard for polarization management within a feedback control system for dynamically adjusting spectral power distributions among different wavelength channels. Micro-optic, hybrid, and planar implementations are proposed along with coupling schemes to larger fiber optic systems. Utility is found throughout multi-channel wavelength division multiplexing (WDM) transmission systems.

73 Claims, 6 Drawing Sheets

DYNAMICALLY CONFIGURABLE SPECTRAL FILTER

BACKGROUND OF THE INVENTION

1. Field of the Invention

The present invention relates generally to dynamically controlling spectral power distributions within optical networks and particularly to controlling spectral power distributions between channels of wavelength division multiplexing systems.

2. Technical Background

Wavelength division multiplexing (WDM) systems, which convey a number of different wavelength channels, undergo various changes that unequally affect the transmission of the different channels. Wavelength-dependent propagation losses and repeater gains, system aging, environmental influences, and the addition or substitution of new wavelength-dependent components can all affect channel power distributions.

Such wavelength-dependent variations accumulating along WDM optical systems, sometimes referred to as "ripple", lead to dissimilar received signal power among the channels and a worsening signal-to-noise ratio (SNR).

Since the weakest signal (channel) must be received with a reasonable SNR, system ripple constrains the maximum system reach.

Permanent spectral power adjustments are often incorporated into optical transmission systems. For example, some optical amplifiers are packaged with gain flattening filters to compensate for uneven gain profiles of the amplifiers. Maintenance adjustments, referred to as "trimming", are sometimes made in established systems to compensate for planned or incidental changes to system profiles. We have recognized that optimized system performance can require continuous or periodic adjustments that compensate for less predictable or temporary fluctuations in the spectral response.

Tunable filters, particularly tunable fiber Bragg gratings, are available with spectral responses that can be shifted along the spectrum. Filter gratings are tuned by varying their periodicity under the control of an external force such as compression or stress. However, the system spectral transmission characteristics that vary over time are not easily counteracted by the shifting of narrow attenuation bands. Especially with respect to closely spaced signals along the spectrum, shifting attenuation bands can disturb adjacent signals.

SUMMARY OF THE INVENTION

Our invention in one or more of its various embodiments dynamically controls spectral power distributions among channels of wavelength division multiplexing (WDM) systems. Individual wavelength channels are separately attenuated in accordance with a desired power distribution among the channels. Real-time or other regular monitoring can be used to oversee the ongoing attenuations, and a control system can be used to further modify the individual attenuations based on any differences between the actual and desired spectral power distributions.

One implementation of our dynamically configurable spectral filter includes a wavelength dispersing system that receives an input beam incorporating a plurality of different wavelength channels and spatially separates the different channels according to their wavelengths. A spatial light modulator differentially affects the channels of the input beam depending on their spatial positions. A spectral monitor distinguishes optical power among the channels. The wavelength dispersing system also realigns the differentially affected channels into a common output beam. However, before doing so, a controller that receives the optical power information from the spectral monitor adjusts the spatial light modulator to achieve a predetermined power distribution among the channels in the output beam.

The controller preferably compares a monitored optical power distribution among the channels to a desired power distribution and adjusts the spatial light modulator to minimize differences between the monitored and desired power distributions. The spatial light modulator, the spectral monitor, and the controller are all preferably arranged in a feedback loop to iteratively reduce the differences between the monitored and desired power distributions among the channels. In addition, the spatial light modulator can also be controlled to attenuate wavelengths between the channels to improve signal-to-noise (SNR) ratios. The wavelength dispersing system preferably includes a diffraction grating that not only disperses the different wavelengths through one diffraction order for controlling the spatial separation between the channels but also disperses portions of the differentially affected channels through another diffraction order for directing the portions to the spectral monitor.

A polarizing system can be used to avoid the effects of polarization sensitivities throughout the filter. The input beam is divided into two polarizations. One of the two polarizations is rotated into alignment with the other, and the parallel polarizations propagate along similar optical paths through the spatial light modulator to reduce polarization-dependent losses. Preferably, the parallel polarizations follow similar optical paths through the wavelength dispersing system to further reduce polarization-dependent losses.

The spatial light modulator can function in a variety of ways, such as by directly attenuating amplitudes or by varying phases or polarities in combination with a directional multiplexing device that converts the phase or polarity variations into amplitude attenuations. A phase modulator can also be used in combination with a polarization dispersive element for attenuating amplitudes of the spatially dispersed wavelengths.

Another implementation of our dynamically configurable spectral filter includes a spatial light modulator that receives a plurality of spatially separated wavelength channels and modulates polarization directions of the channels depending on their relative spatial positions. A polarization-sensitive optic that exhibits different transmission efficiencies as a function of polarization direction aligns the separated channels into a common output beam at relative efficiencies corresponding to the polarization directions of the individual channels. A control system converts a monitored optical power distribution among the channels into a feedback adjustment of the spatial light modulator to achieve a desired power distribution among the channels in the output beam.

The polarization-sensitive optic is preferably a diffractive optic whose diffraction efficiency varies with the polarization direction. Several other functions can also be carried out by the same diffractive optic. For example, the diffractive optic preferably aligns major portions of the separated channels through one order of diffraction for constructing the common output beam and diverts remaining portions of the separated channels through another order of diffraction for carrying out the feedback adjustment. Operating in a retro-mode that retraces a path toward the input, the same diffractive optic can be used both to spatially separate the channels in advance of the spatial light modulator and to realign the separated channels returning from the spatial light modulator.

A polarization manager is preferably used to linearly polarize the channels before first encountering the polarization-sensitive diffractive optic. Mixed polarizations of the channels are converted into pairs of pure polarization states. The spatial light modulator can be arranged as a phase or polarization modulator that converts the linear polarizations of the channels into elliptical polarizations. The division of light between the orthogonal polarization axes of the channels affects the efficiency by which the wavelengths are further diffracted into realignment.

Optical paths through the new filter are preferably formed in a planar waveguide. The different wavelength channels are conveyed along an optical path that extends (a) past a wavelength disperser that spatially separates the different channels, (b) past a spatial light modulator that at least indirectly modulates individual amplitudes of the spatially separated channels, and (c) through a common output. A control loop includes another optical path that extends from the spatial light modulator to a converter that adjusts the individual amplitudes of the channels based on differences between the actual amplitudes and desired amplitudes of the channels.

A polarization coupler can be formed in the waveguide for linearly polarizing the range of different wavelength channels along the optical path to the wavelength disperser. A focusing optic of the wavelength disperser can also be formed in the waveguide for converting an angular separation between the channels into a linear separation along the spatial light modulator. Although it would be possible to integrate a diffractive optic in conjunction with or as a complete alternative to the focusing optic within the waveguide, current manufacturing techniques favor attaching a separately formed diffractive optic to the waveguide. Alternatively, a phase array can be more readily integrated into the waveguide to perform the wavelength dispersing function.

The spatial light modulator, such as a liquid-crystal modulator, can also be fabricated in planar form within the waveguide. Other possible built-in devices within the waveguide include a spectral monitor (e.g., a diode array) with its own focusing optic and an amplifier (e.g., semiconductor amplifier array) formed along the path between the wavelength disperser and the spatial light modulator.

For economy of space and complexity, the through optical path is operated in a retro-mode. The elliptically polarized or otherwise affected channels from the spatial light modulator return past the wavelength disperser for realigning the different channels into the common output beam. An optical circulator is preferably coupled to a common input and output of the planar waveguide for connecting the filter to a larger optical system.

Additional features and advantages of the invention will be set forth in the detailed description which follows and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

DETAILED DESCRIPTION OF THE PREFERRED EMBODIMENTS

Figure 1:
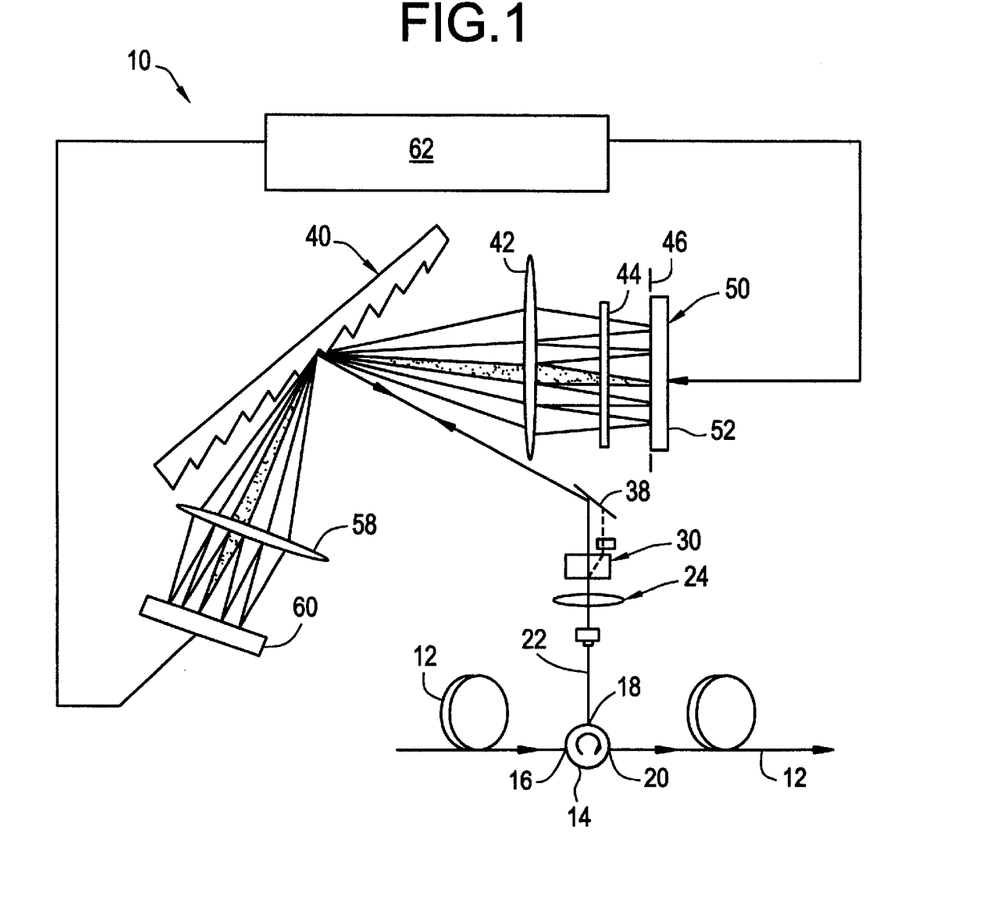
FIG. 1 is a diagram of one example of our dynamically configurable filter assembled with bulk optics.

Reference will now be made in detail to the present preferred embodiments of the invention, examples of which are illustrated in the accompanying drawings. An exemplary dynamically configurable filter 10 is shown in FIG. 1 connected in line to a larger fiber optic system 12 through a circulator 14. A first port 16 of the circulator 14 receives a range of different wavelength channels from the fiber optic system 12 and directs the different wavelength channels through a second port 18 to the dynamically configurable filter 10. Amplitude adjusted channels return from the filter 10 to the second port 18 and are further directed through a third port 20 to rejoin the fiber optic system 12 in the original direction of propagation.

A fiber tail 22 extending from the second circulator port 18 couples the wavelength channels to a free space within the filter 10 through a collimator 24. The end of the fiber tail 22 is preferably cleaved at a 10 degree angle or coated with an anti-reflection coating to reject unwanted back reflections. A base plate (not shown) provides a mounting platform for stabilizing components of the filter 10 within the free space.

Figure 2:
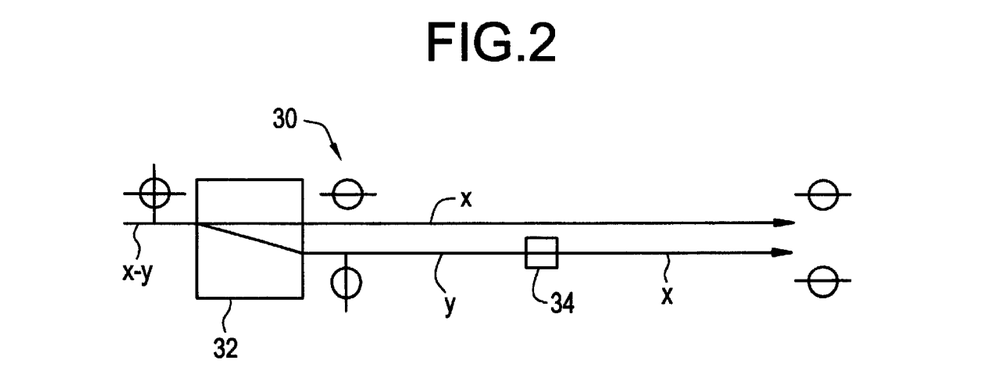
FIG. 2 is an enlarged scale depiction of a polarization manager used in the filter of FIG. 1.

A polarization manager 30 depicted in FIG. 2 linearly polarizes the wavelength channels in a direction (e.g., x polarization) that maximizes transmission efficiencies through the filter 10 prior to encountering any polarization-sensitive components of the filter. A polarization dispersive element 32, such as a birefringent walk-off plate, wedge, or prism separates a mixed (arbitrary) polarization state "x-y" into two orthogonal linearly polarized (pure) states "x" and "y". Exemplary materials for the dispersive element 32 include Calcite, Rutile, Lithium Niobate, Yttrium Vanadate, Lithium Tantalate, and Quartz. A half-wave plate 34 (also referred to as a retardation plate) rotates one of the two orthogonal linear polarizations (e.g., "y" polarization) parallel to the other linear polarization (e.g., "x" polarization). The two identical polarizations propagate in parallel (e.g., spaced normal to the plane of FIG. 1) through the filter 10.

A reflector 38 or other directional control element directs the linearly polarized wavelength channels to a wavelength dispersive element, shown as a reflective diffraction grating 40. The linear polarization (e.g., "x" polarization) is oriented perpendicular to lines of the grating 40 to efficiently diffract the wavelength channels through a range of different angles. A resolving power on the order of 1200 lines per millimeter is preferably used to angularly distinguish the wavelength channels. The required wavelength dispersion could also be accomplished by other diffractive or refractive optics including gratings, prisms, thin film elements, or phase arrays operating under reflection or transmission.

A focusing optic depicted as a lens 42 focuses the angularly dispersed wavelength channels in unique positions dispersed along a focal line 46 coincident with a spatial light modulator 50. However, before striking the spatial light modulator 50, a half-wave plate 44 rotates the linearly polarized wavelength channels through 45 degrees to orient the wavelength channels with respect to the spatial light modulator 50.

The primary purpose of the modulator 50 is to relatively adjust amplitudes of the different wavelength channels. Wavelength regions between the channels can also be attenuated to better distinguish the signals from background noise (i.e., improve the signal-to-noise ratio). The amplitude modulation can take place (a) directly using a spatial amplitude modulator such as an acousto-optical modulator or (b) indirectly using a spatial phase or polarity modulator such as a pixellated nematic or ferroelectric liquid-crystal modulator in combination with a phase- or polarity-sensitive element.

The depicted spatial light modulator 50 is an electro-optical spatial phase modulator that converts the linearly polarized wavelength channels into varying degrees of elliptical polarization in response to controlling voltages. Following the orienting function provided by the half-wave plate 44, the spatial phase modulator 50 relatively retards phases of the linearly polarized wavelength channels to form elliptical polarizations based on the amount of phase retardation.

A reflective surface 52 located on a back side of the phase modulator 50 retroreflects the elliptically polarized wavelength channels back through the wave plate 44 and the focusing lens 42 to the reflective diffraction grating 40. The wave plate 44 rotates the "x" components of the elliptical polarizations back into their original orientations. The modulated wavelength channels also include "y" components in varying proportions related to the amounts of phase retardation.

The reflective diffraction grating 40 which is preferably highly polarization sensitive, rediffracts the returning wavelength channels into alignment with one another on route back to the circulator 14. The efficiency through which each of the wavelength channels is further diffracted is inversely related to the magnitude of the "y" component of the elliptical polarization. Thus, the polarization sensitivity of the reflective diffraction grating 40 converts the phase modulation imposed by the spatial phase modulator 50 into individual amplitude modulations of the different wavelength channels. This function could also be performed or enhanced by another polarization-sensitive component or a component specifically arranged for polarization dispersion.

The output transmission "T(Vn)" of any numbered "n" channel is given by the following equation:

$$T(V_n) = L \cos^2(\phi_y(V_n) - \phi_x)$$

where "L" is the insertion loss of the whole filter 10, "$V_n$" is a voltage applied to pixel "n" of the spatial light modulator 50, "$\phi_y$" is the phase retardation applied in the "y" direction, and "$\phi_x$" is the phase retardation applied in the "x" direction. Changes to the voltage applied to each of the pixels modifies the power distribution between the different wavelength channels.

Figure 3:
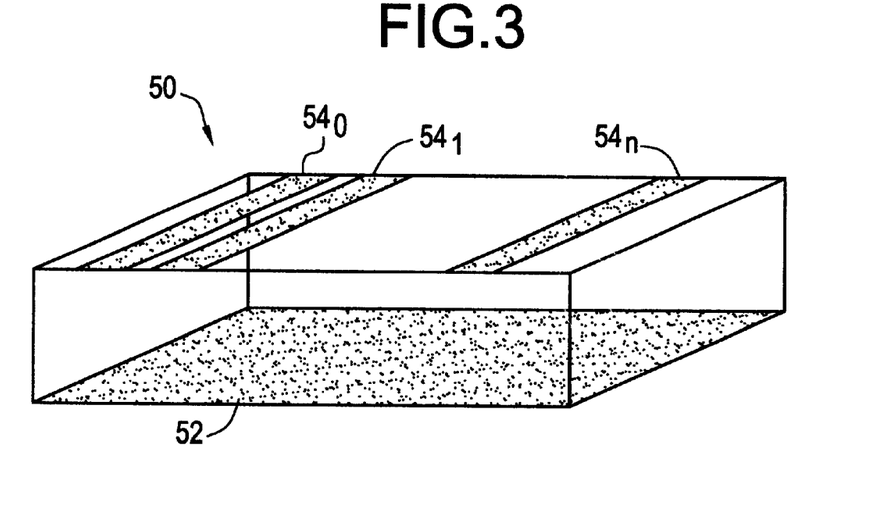
FIG. 3 is an enlarged scale depiction of a spatial phase modulator used in the filter of FIG. 1.

An enlarged view of the spatial phase modulator 50, which is shown in FIG. 3, includes an array of electrically addressable liquid-crystal pixels that is electrically coupled to a corresponding array of electrodes $54_0$–$54_n$. Similar to other liquid-crystal modulators, the liquid crystals of the modulator 50 have long axes aligned along the illustrated "y" axis when no voltage is applied. However, the pixels are preferably non-uniformly positioned along the illustrated "x" axis to accommodate variations in the focus spot sizes of the different wavelength channels. Diffraction angles and corresponding focus spot sizes of the longer wavelength channels tend to be larger than the shorter wavelength channels.

Figure 4:
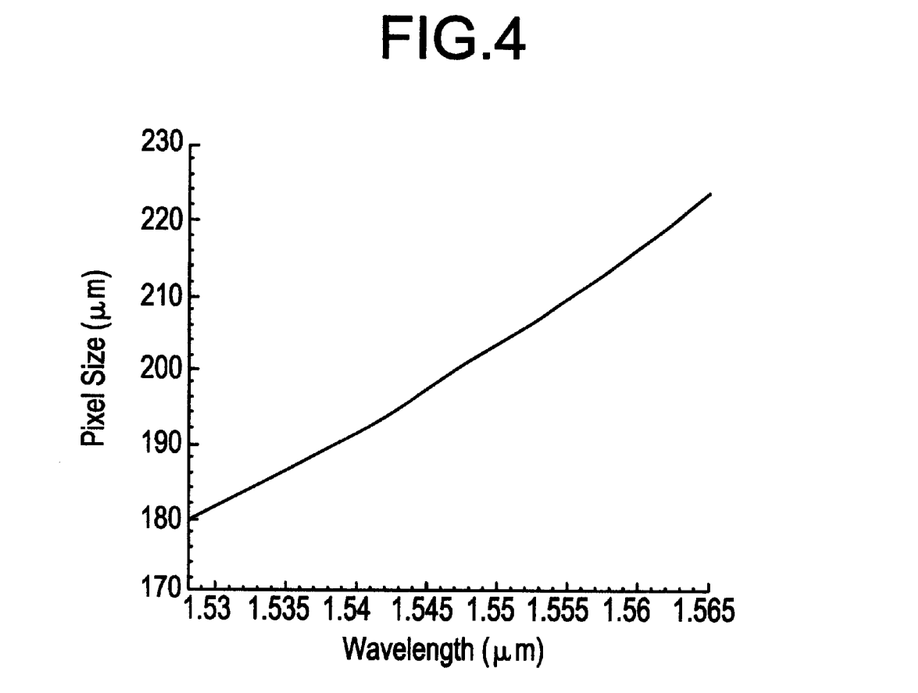
FIG. 4 is a graph plotting pixel size in the spatial phase modulator as a function of wavelength.

A pixel spacing for achieving improved channel control can be determined from the following equations:

$$X_n = F \sin(\theta_n - \theta_0)$$

$$\theta_n = \arcsin\left(\frac{\lambda_n}{d} - \sin\theta_0\right)$$

where "$x_n$" is the position of the "$n^{th}$" pixel along the array $54_0$–$54_n$, "F" is the focal length of the lens 42, "$\theta_n$" is the diffraction angle corresponding to a wavelength channel "$\lambda_n$", "$\theta_0$" is the central channel diffraction angle, and "d" is the line density of the diffraction grating 40. A plot of corresponding pixel size as a function of wavelength is plotted in FIG. 4.

In addition to dispersing, recombining, and converting polarity-to-amplitude modulation of the different wavelength channels, the diffraction grating 40 (see FIG. 1) also diffracts small portions of the returning wavelength channels through a different diffraction order. For example, if the dispersing and recombining functions take place through a first order of diffraction, the additional diffraction could take place at a zero diffraction order. The channel portions diffracted through the alternative order (e.g., zero) remain angularly dispersed, and a focusing optic 58 refocuses the angularly dispersed channel portions onto a spectral monitor 60.

The amplitude variations among the channel portions are detected by the spectral monitor 60, which is preferably a diode array; and this information concerning the spectral power distribution is communicated to a controller 62. The monitored channel transmissions "T0(Vn)" are complementary to the transmissions "T(Vn)" diffracted through the first order as follows:

$$T0(V_n) = L \sin^2(\theta_y(V_n) - \theta_x)$$

A simple conversion relates the monitored channel transmissions "T0(Vn)" to their complementary counterparts through the first order as follows:

$$T(V_n) = L - T_0(V_n)$$

Within the controller 62, a comparison is made between the monitored (presumably actual) spectral power distribution among the channels and a desired power distribution among the channels, and control signals (e.g., drive voltages) are supplied to the individual electrodes of the spatial phase modulator 50 according to conventional algorithm for matching test and target values. The desired spectral power distribution is normally an equal power distribution among channels, but other distributions are possible for purposes of anticipating imbalances arising elsewhere or other needs to treat channels or groups of channels differently.

The spectral monitor 60, the controller 62, and the spatial phase modulator 50 are arranged in a feedback loop, wherein the modulations imparted by spatial phase modulator 50 under the direction of the controller 62 can be immediately detected by the spectral monitor 60 and used as a basis for making more refined modulations to better approach the desired power distribution. The iterations can be timed to match the response rates of the components.

Although the diffraction grating 40 is a convenient location for diverting small portions of the wavelength channels for purposes of monitoring, similar information can be extracted from the filtered wavelength channels virtually anywhere along the return path to the circulator 14 or even within or beyond the circulator 14. A feed forward signal containing information about the wavelength channels in advance of the spatial phase modulator 50 could also be supplied to the controller 62 to provide additional information concerning the required overall modulation and the ongoing effects of the practiced controls.

On passing back through the polarization manager 30, a mixed polarization is restored to the differentially modulated wavelength channels. The circulator 14 directs the returning channels reentering the second port 18 to the third port 20, where the channels rejoin the larger fiber optic system 12. Separate optical paths to and from our dynamically configurable filter 10 can be provided by slightly tilting the reflective surface 52 or by operating the filter in a transmissive rather than reflective mode following the spatial light modulator 50. Additional components would be needed to realign and recombine the channels into a similar output.

Figure 5A:
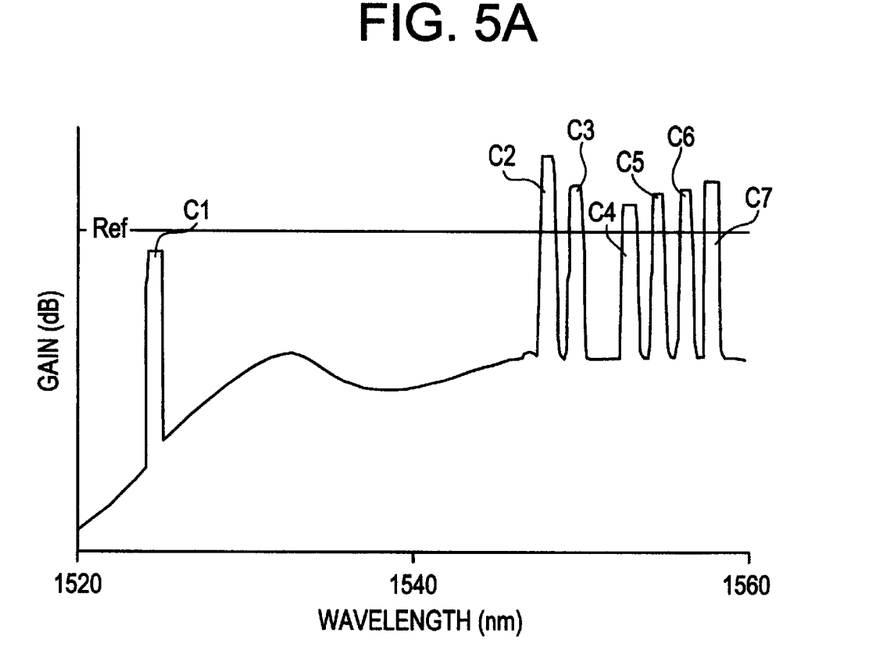
FIGS. 5A and 5B are graphs demonstrating the channel equalizing possibilities of the filter.
Figure 5B:
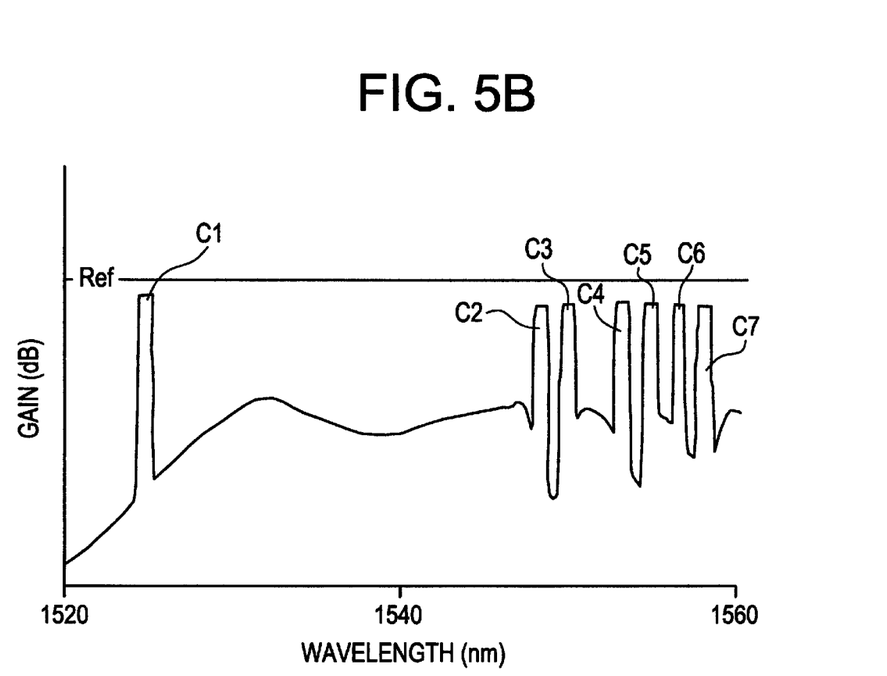

FIGS. 5A and 5B demonstrate gain flattening possibilities for seven different wavelength channels "C1" through "C7". Before activating the filter 10, a significant gain ripple is recorded in FIG. 5A. After activating the filter 10, the gain ripple as recorded in FIG. 5B is much reduced. The larger spacing between channels "C1" and "C2" demonstrates the filter's capability for flattening additional channels spaced similar to channels "C2" through "C7".

The layout of our dynamically configurable filter can be changed to accommodate other approaches to amplitude modulation. A direct approach to amplitude modulation at the spatial light modulator (e.g., an acousto-optic amplitude modulator) eliminates the need for the wave plate 44 and any reliance on other elements (e.g., the diffraction grating 40) to exhibit polarization sensitivity. Phase modulation can also be converted into an amplitude modulation by the mechanism of interference.

Figure 6:
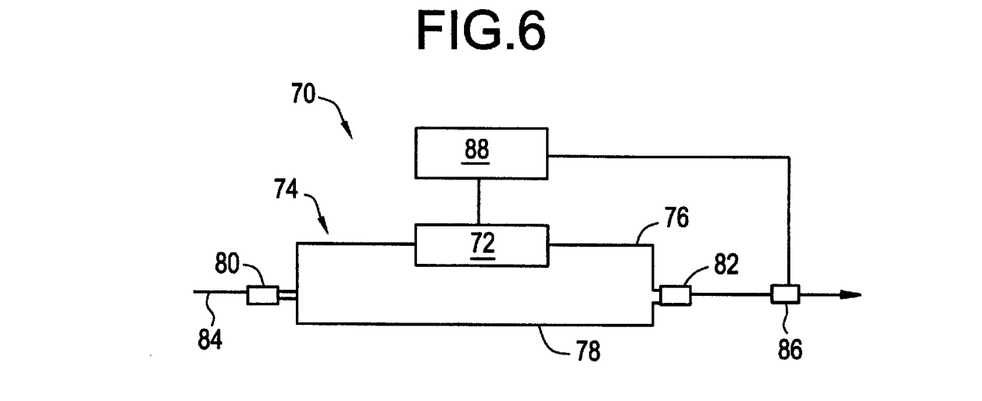
FIG. 6 is a diagram of our dynamically configurable filter in a Mach-Zender arrangement.

For example, FIG. 6 is a simplified block diagram of a dynamically configurable filter 70 mounting a spatial phase modulating system 72 within one arm 76 of a Mach-Zender interferometer 74. A first 3 dB coupler 80 equally splits incoming light from a larger fiber optic system 84 between the arm 76 and a reference arm 78. The incoming light contains a range of different wavelengths (e.g., a succession of different wavelength channels). The spatial phase modulating system spatially separates the different wavelengths, differentially modulates the phases of the different wavelengths, and recombines the different wavelengths for further propagation to a second 3 dB coupler 82, where the modulated wavelengths are rejoined with their unmodulated counterparts from the reference arm 78. Polarization management can be employed similar to the preceding embodiment to overcome any polarization sensitivities of these components.

Figure 7:
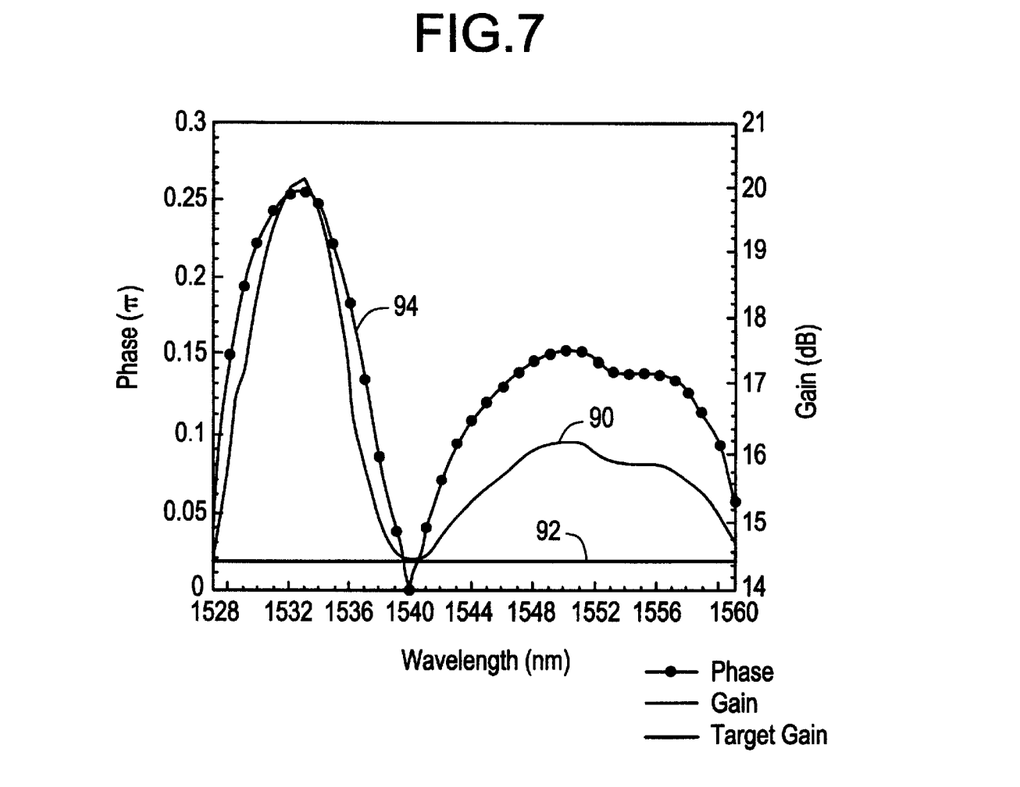
FIG. 7 is a graph relating variations in phase as a function of wavelength to achieve a target gain profile.

Interference between the modulated and unmodulated portions of the different wavelengths alters the amplitudes of the wavelengths subject to phase modulation. An example of the phase changes required to flatten a given spectral response is provided by the graph of FIG. 7. Phase in radians and gain in decibels (dB) are both referenced along the graph ordinate with respect to a common domain of wavelengths. An exemplary gain profile 90 is contrasted with a flat target gain profile 92. The phase shifts required of the filter 70 to convert the gain profile 90 to the target profile 92 are plotted by the curve 94.

A fiber coupler 86 (such as a one percent tap) directs a small portion of the filtered light to a control system 88 that adjusts the spatial phase modulating system 72 to approach the target gain profile (e.g., the flat gain profile 92). Within the control system 88, the filtered light is preferably separated into wavelength components, spectrally monitored, and compared to the target gain profile to generate appropriate drive signals for the spatial phase modulating system. The spatial phase modulator itself, which is not shown, is preferably an electro-optic modulator, particularly a liquid-crystal modulator similar to the previous embodiment under the control of drive voltages. A similar algorithm can be used to relate the drive voltages producing phase modulations to actual amplitude attenuations within a continuous feedback loop.

Figure 8:
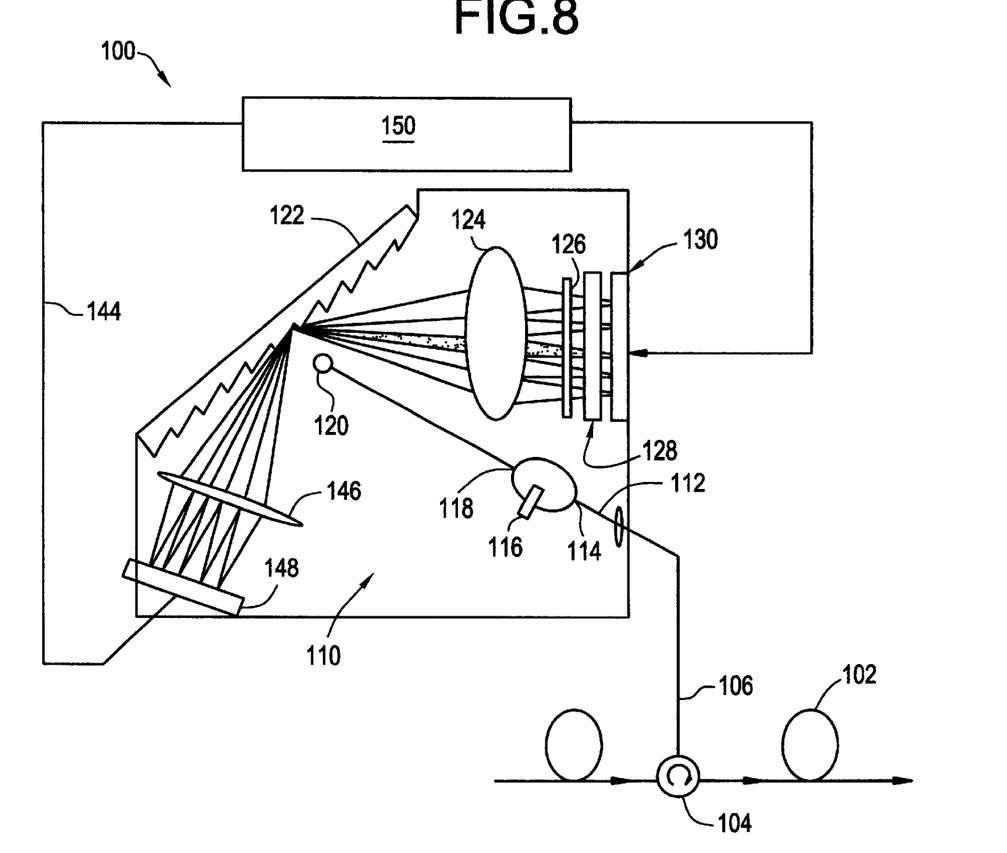
FIG. 8 is a diagram of a hybrid implementation of our dynamically configurable filter.

A hybrid implementation of another dynamically configurable filter 100 is depicted in FIG. 8. The filter 100 is coupled to a larger fiber optic system 102 through a circulator 104. A fiber tail 106 from the circulator 104 is coupled to a planar waveguide device 110 through a splice. Features within the planar waveguide device 110 can be formed by conventional techniques including controlled depositions onto an underlying substrate and lithographic imaging.

A common entrance and exit waveguide 112 is temporarily split by an integrated polarization coupler 114 that separates mixed polarization light into its orthogonal components. One of the linear polarizations traverses a half-wave plate 116 before rejoining the other polarization at another integrated coupler 118 with a matching polarization. An integrated collimator 120 projects the linearly polarized light onto a reflective diffraction grating 122 that is attached to the planar device 110.

Figure 9:
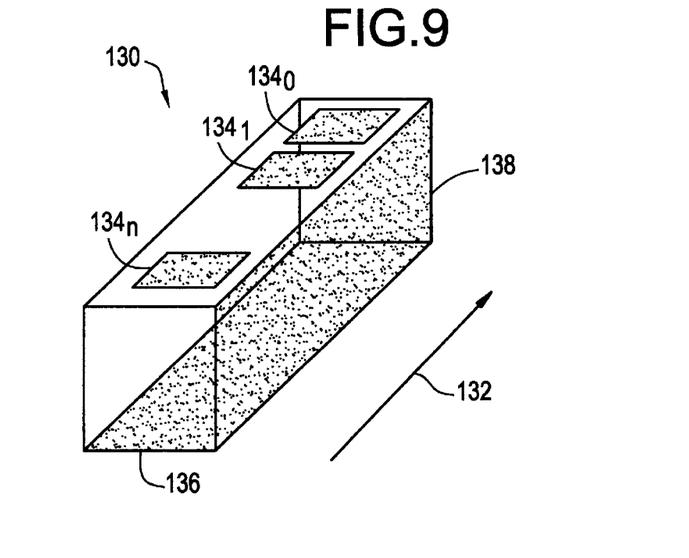
FIG. 9 is an enlarged scale depiction of an integrated spatial phase modulator of the hybrid implementation.

The diffraction grating 122 diffracts different wavelengths of the polarized light through a range of angles, and an integrated lens 124 focuses the different wavelengths in spatially dispersed positions along a liquid-crystal modulator 130, which is also formed in the planar device 110. An isolated view of the liquid-crystal modulator 130 is shown in FIG. 9.

The liquid-crystal modulator 130 can be formed in a pre-defined trench having a width of just a few microns. Long axes of a liquid-crystal material, such as nematic liquid crystals, are aligned in the direction of arrow 132 along a length of the trench. Top electrodes $134_0$–$134_n$ are paired with a common ground electrode 136 to define an array of separately addressable pixels. A high reflection multi-layer or thin film coating 138 is applied to a back surface of the trench to operate the liquid-crystal modulator in a reflection mode.

A wave plate 126 orients the linear polarized light in advance of the liquid-crystal modulator 130 and restores the original polarization orientation of the unmodulated wavelengths reflected from the liquid-crystal modulator 130. Similar to the micro-optical implementation of FIG. 1, wavelengths that have more pronounced elliptical polarizations imposed by the liquid-crystal modulator 130 are rediffracted into alignment with the common entrance and exit waveguide 112 with less efficiency than the unmodulated wavelengths that retain their original linear polarity. The spectral power distribution of the light returning to the circulator 104 is modified by the selective influence of the liquid-crystal modulator 130 on different wavelengths.

Inevitably, some insertion losses occur throughout the planar device 110, particularly at interfaces with bulk components such as the diffraction grating 122 or wave plates 116 and 126. These losses are mitigated in the planar device 110 by the addition of an integrated array of semiconductor optical amplifiers (SOAs) 128 located within a wavelength dispersed region between the lens 124 and the liquid-crystal modulator 130. The amplifiers 128 preferably restore at least some power to each of the wavelengths.

A feedback control loop 144, similar in function to the micro-optic implementation of FIG. 1, is at least partially integrated into the planar device 110. Returning wavelengths diffracted through a different diffraction order are focused by an integrated lens 146 into spatially dispersed positions along an integrated diode array 148. Information concerning the relative amplitudes of the different wavelengths is transferred along the feedback control loop 144 to a controller 150. Algorithms within the controller 150 compare the monitored power distribution among the wavelengths to a desired power distribution having regard to prior effects of the controller to generate control signals (e.g., drive voltages) for operating the liquid-crystal modulator 130.

Also similar to the previously discussed micro-optic implementations, the hybrid implementation can be modified to include other types of wavelength dispersers (e.g., prisms, thin film elements, or phase arrays) and spatial light modulators (e.g., phase, polarization, or amplitude modulators). Routing through the device can be unidirectional (e.g., different input and output), bi-directional (e.g., same or closely spaced input and output), or split (e.g., two arms of an interferometer). Separate input and output ports can be particularly cost and package effective in hybrid and planar implementations. Electronic processing and control are preferred, but other control approaches including optical addressing of the spatial light modulators are also possible.

Figure 10:
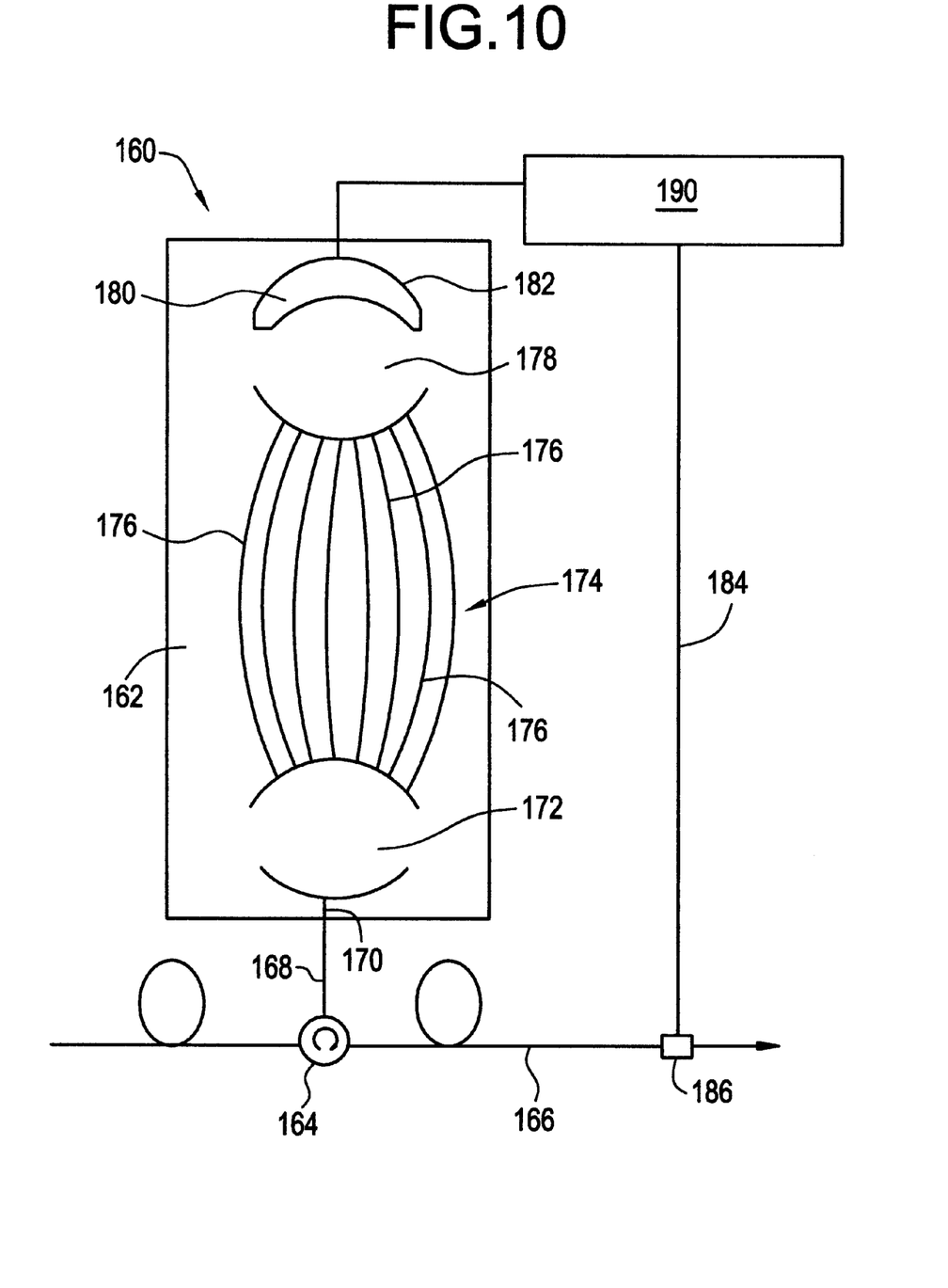
FIG. 10 is a diagram of a substantially planar implementation of our dynamically configurable filter.

A further integrated implementation of our dynamically configurable filter is depicted in FIG. 10. The illustrated filter 160 is predominately in a planar form integrated within a planar waveguide device 162. A circulator 164 connects the planar waveguide device 162 to a larger fiber optic system 166. A fiber tail 168 of the circulator 164 is spliced to a common input and output waveguide 170 of the planar device 162.

An integrated focusing optic 172 couples an entire range of different wavelengths to a phase array 174, which functions as a wavelength disperser. Individual waveguides 176 of the phase array 174 are preferably arranged with progressively varying optical path lengths that tend to tilt wavelengths also by progressively varying amounts. Another integrated focusing optic 178 focuses the different wavelengths in spatially dispersed positions along a spatial light modulator 180.

The modulator 180, which imparts either phase or amplitude modulation, can be integrated into the planar device 162 using a segmented trench design or segmented thermo-optic heating. A reflective coating 182 returns the relatively modulated wavelengths back through the phase array 174 to the common input and output waveguide 170. Amplitude modulation directly reduces the remaining power of selected wavelengths. Phase modulation has a similar effect through increased coupling losses at the output.

The phase array 174 provides wavelength dispersion insensitive to polarizations. However, polarization management may still be required if the spatial light modulator 180 exhibits polarization sensitivity.

A feedback loop 184 provides for dynamically reconfiguring the filter 160 similar to the earlier described implementations. A coupler 186 extracts a small portion of the filtered light for analysis. A controller 190 processes this information to generate control signals for the spatial light modulator 180. Continuous adjustments can be made to reach or maintain target spectral gain distributions.

Our dynamically configurable filter is particularly useful as an equalizer that adjusts power among channels propagating in multi-channel (WDM) transmission systems. Each of the channels can be separately addressed and dynamically controlled to equalize or adjust the distribution of power among the channels. Maintaining a more even distribution of power among channels is expected to extend system reach. Also, wavelength regions between channels can be separately attenuated or attenuated in combination with adjustments to the power distribution among the channels to extend the system reach.

Both overall system control and control compensating for more localized events are possible. The dynamic configurability of our filter can also be used to compensate for chronic wavelength variations due to such factors as laser wavelength drift or system aging as well as for more acute wavelength variations such as those associated with adding and dropping channels.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A dynamically configurable spectral filter comprising:
   a wavelength dispersing system that receives an input beam having a plurality of different wavelength channels and spatially separates the different wavelength channels of the input beam;
   a spatial light modulator that differentially affects the different wavelength channels of the input beam depending on their spatial positions,
   wherein the wavelength dispersing system also provides for realigning the differentially affected channels into a common output beam;
   a spectral monitor that distinguishes optical power among the differentially affected channels; and
   a controller that receives the optical power information from the spectral monitor and adjusts the spatial light modulator to achieve a predetermined power distribution among the differentially affected channels of the output beam.

2. The filter of claim 1 in which the controller compares a monitored optical power distribution among the channels to a desired power distribution among the channels and adjusts the spatial light modulator to minimize differences between the monitored and desired power distributions among the channels.

3. The filter of claim 2 in which the spatial light modulator, the spectral monitor, and the controller are arranged in a feedback loop to iteratively reduce the differences between the monitored and desired power distributions among the channels.

4. The filter of claim 1 in which the spatial light modulator differentially affects wavelengths between the wavelength channels of the input beam depending on their spatial positions.

5. The filter of claim 1 in which the wavelength dispersing system diffracts the input beam for angularly separating the different channels of the input beam.

6. The filter of claim 5 in which the wavelength dispersing system diffracts the differentially affected channels for realigning the channels into the output beam.

7. The filter of claim 1 in which the wavelength dispersing system directs portions of the differentially affected channels to the spectral monitor.

8. The filter of claim 1 in which the wavelength dispersing system separates the differentially affected channels into first portions that are realigned for further propagation within the output beam and second portions that are transmitted to the spectral monitor.

9. The filter of claim 8 in which the wavelength dispersing system diffracts the first and second portions of the differentially affected channels through different orders of diffraction.

10. The filter of claim 9 in which the controller converts the spectral power distribution of the second portion of the differentially affected channels that are diffracted through one diffraction order into values that correspond more closely to the spectral power distribution of the first portion of the differentially affected channels that are diffracted through the other diffraction order.

11. The filter of claim 1 including a polarizing system that divides the input beam into two polarizations, rotates one of the two polarizations parallel with the other, and propagates the parallel polarizations along similar optical paths through the spatial light modulator to reduce polarization-dependent losses.

12. The filter of claim 11 in which the parallel polarizations follow similar optical paths through the wavelength dispersing system to further reduce polarization-dependent losses.

13. The filter of claim 11 in which the spatial light modulator includes a phase modulator arranged in combination with a polarization dispersive element for differentially attenuating amplitudes of the different channels.

14. The filter of claim 13 in which the wavelength dispersing system includes a polarization-sensitive component that functions as the polarization dispersive element.

15. The filter of claim 14 in which the polarization-sensitive component also functions to realign the differentially affected channels into the common output beam.

16. The filter of claim 15 in which the polarization-sensitive component also functions to spatially separate the different channels of the input beam.

17. The filter of claim 16 in which the polarization-sensitive component is a diffraction grating.

18. The filter of claim 1 further comprising a circulator having first, second, and third ports, the first port circulating light to the second port and the second port circulating light to the third port, and the second port functioning as the input to the filter for the input beam and also functioning as an output from the filter for the common output beam.

19. The filter of claim 1 further comprising an array of amplifiers that amplify the spatially separated channels prior to the realignment of the channels.

20. An optical equalizer for a wavelength division multiplexing system comprising:
a polarization manager that converts a mixed polarization signal into a signal having pure polarization states;
a wavelength disperser that spatially separates wavelength channels of the signal;
a spatial light modulator that at least indirectly modulates individual amplitudes of the spatially separated wavelength channels;
a spectral monitor that detects amplitude differences between the wavelength channels; and
a controller that controls the spatial light modulator to adjust the individual amplitudes of the wavelength channels based on differences between the monitored amplitudes and desired amplitudes of the wavelength channels.

21. The equalizer of claim 20 in which the polarization manager separates the signal into two orthogonal polarizations and relatively rotates one of the polarizations parallel to the other.

22. The equalizer of claim 21 in which the polarization manager realigns the two polarizations into another mixed polarization signal.

23. The equalizer of claim 20 in which the wavelength disperser directs spatially separated wavelength channels to the spectral monitor.

24. The equalizer of claim 20 in which the wavelength disperser angularly distinguishes the different wavelength channels and focuses the angularly dispersed wavelength channels in different positions along a common focal line.

25. The equalizer of claim 20 in which the spatial light modulator includes a phase modulator that modulates phases of the individual wavelength channels.

26. The equalizer of claim 25 in which the spatial light modulator also includes a signal divider that divides the signal into two portions including one portion that traverses both the wavelength disperser and the phase modulator and another portion that does not so traverse and a signal combiner that combines the two portions of the signal to modulate amplitudes of the individual wavelength channels by a mechanism of interference.

27. The equalizer of claim 25 in which the wavelength disperser converts the phase variations of individual channels into amplitude modulations of the channels.

28. The equalizer of claim 20 in which the spatial light modulator is divided into individual control regions corresponding to spatial positions of the different wavelength channels, and the individually controlled regions vary in size.

29. The equalizer of claim 28 in which the individually controlled regions vary in size as a function of wavelength.

30. The equalizer of claim 20 in which the spatial light modulator, the spectral monitor, and the controller are interconnected within a feedback loop to iteratively reduce the detected amplitude differences between the wavelength channels.

31. The equalizer of claim 20 in which the spatial light modulator differentially affects wavelengths between the wavelength channels of the signal depending on their spatial positions.

32. The equalizer of claim 20 further comprising an amplifier that amplifies the spatially separated wavelength channels.

33. The equalizer of claim 32 in which the wavelength disperser separates the wavelength channels into first portions that are realigned for further propagation and second portions that are transmitted to the spectral monitor.

34. The equalizer of claim 33 in which the wavelength disperser diffracts the first and second portions of the differentially affected channels through different orders of diffraction.

35. The equalizer of claim 34 in which the controller converts a spectral power distribution of the second portion of the differentially affected channels that are diffracted through one diffraction order into values that correspond more closely to a spectral power distribution of the first portion of the differentially affected channels that are diffracted through the other diffraction order.

36. A method of dynamically configuring a spectral filter comprising the steps of:
    spatially distinguishing different wavelength channels of an input beam spanning a range of wavelengths;
    differentially modulating amplitudes of the spatially distinguished channels of the input beam;
    realigning the differentially modulated channels into a common output beam;
    monitoring optical power of the different channels; and
    further differentially modulating amplitudes of the spatially distinguished channels to iteratively reduce differences between the monitored power distributions and a desired power distribution among the channels.

37. The method of claim 36 in which the step of spatially distinguishing includes angularly separating wavelength channels of the input beam.

38. The method of claim 37 in which the step of differentially modulating includes at least indirectly modulating individual amplitudes of the spatially separated wavelength channels.

39. The method of claim 38 in which the step of differentially modulating includes modulating phases of the spatially separated wavelength channels.

40. The method of claim 39 in which the step of differentially modulating also includes converting the resulting phase modulations into amplitude modulations of the different channels.

41. The method of claim 36 including a further step of modulating amplitudes of wavelengths between the spatially distinguished channels.

42. The method of claim 36 in which the step of realigning includes diffracting the differentially modulated channels through one order of diffraction, and the step of monitoring includes diffracting the differentially modulated channels through a different order of diffraction that maintains a spatial separation between the channels.

43. The method of claim 36 including the further step of amplifying the spatially distinguished channels of the input beam to compensate for insertion losses.

44. The method of claim 36 including a further step of separating the wavelength channels into first portions that are realigned into the common output beam and second portions that are monitored.

45. The method of claim 44 in which the step of separating includes diffracting the first and second portions of the wavelength channels through different orders of diffraction.

46. The method of claim 45 including a further step of converting a spectral power distribution of the second portion of the wavelength channels that are diffracted through one diffraction order into values that correspond more closely to a spectral power distribution of the first portion of the wavelength channels that are diffracted through the other diffraction order.

47. A dynamically configurable spectral filter comprising:
    a spatial light modulator that receives a plurality of spatially separated wavelengths and that relatively modulates polarization directions of the separated wavelengths depending on their relative spatial positions;
    a polarization-sensitive optic that exhibits different transmission efficiencies as a function of polarization direction and that aligns the separated wavelengths into a common output beam at relative efficiencies corresponding to the polarization directions of the wavelengths; and
    a control system that converts a monitored optical power distribution among the wavelengths into a feedback adjustment of the spatial light modulator to achieve a desired power distribution among the wavelengths in the output beam.

48. The filter of claim 47 in which the polarization-sensitive optic is a diffractive optic that exhibits diffraction efficiencies that vary with the polarization direction and that aligns the separated wavelengths through one order of diffraction.

49. The filter of claim 48 in which the diffractive optic diverts portions of the separated wavelengths through another order of diffraction for carrying out the feedback adjustment.

50. The filter of claim 49 in which the diffractive optic receives an input beam containing a range of wavelengths and spatially separates the wavelengths in advance of the spatial light modulator.

51. The filter of claim 47 further comprising a polarization manager that linearly polarizes the wavelengths.

52. The filter of claim 51 in which the polarization manager converts mixed polarizations of the wavelengths into pairs of pure polarization states.

53. The filter of claim 51 in which the spatial light modulator converts the linear polarizations of the wavelengths into elliptical polarizations.

54. The filter of claim 53 in which the polarization manager rotates the linear polarizations of the wavelengths in advance of the spatial light modulator to enhance the conversion.

55. An integrated device for a dynamically configurable spectral filter comprising:
    a planar waveguide that conducts light having a range of different wavelengths along an optical path that extends (a) past a wavelength disperser that spatially separates the different wavelengths, (b) past a spatial light modulator that at least indirectly modulates individual amplitudes of the spatially separated wavelengths, and (c) through a common output; and
    a control loop that includes another optical path in the planar waveguide from the spatial light modulator to a converter that adjusts the individual amplitudes of the wavelengths based on differences between the actual amplitudes and desired amplitudes of the wavelengths.

56. The device of claim 55 including a polarization coupler formed in the waveguide for linearly polarizing the range of different wavelengths along the path to the wavelength disperser.

57. The device of claim 55 in which the wavelength disperser includes a focusing optic formed in the waveguide for converting an angular separation between the wavelengths into a linear separation along the spatial light modulator.

58. The device of claim 57 in which the wavelength disperser includes a diffraction grating attached to the planar waveguide.

59. The device of claim 55 in which the converter includes a spectral monitor formed in the waveguide for distinguishing amplitude differences between the wavelengths.

60. The device of claim 59 in which the spectral monitor is a built-in diode array.

61. The device of claim 59 in which a focusing optic formed in the waveguide converts an angular separation between the wavelengths into a linear separation along the spectral monitor.

62. The device of claim 55 including an array of amplifiers formed in the waveguide along the path between the wavelength disperser and the spatial light modulator.

63. The device of claim 62 in which the array of amplifiers is a semi-conductor amplifier array.

64. The device of claim 55 in which the optical path from the spatial light modulator to the output returns the spatially separated wavelengths to the wavelength disperser for realigning the different wavelengths.

65. The device of claim 64 in which an optical circulator is coupled to a common input and output of the planar waveguide.

66. An integrated dynamically configurable spectral filter formed in a planar waveguide comprising:

a common pathway that conveys a range of different wavelength signals through the planar waveguide;

individual planar pathways that convey the different wavelength signals through the planar waveguide;

a central planar pathway that couples the different wavelength signals through the planar waveguide between the common pathway and the individual pathways;

the central pathway including a wavelength dispersing mechanism that spatially separates the different wavelength signals;

a spatial light modulator connected to the individual pathways for at least indirectly modulating individual amplitudes of the different wavelength signals; and a controller that controls the spatial light modulator to adjust the individual amplitudes of the wavelength signals.

67. The filter of claim 66 in which the wavelength dispersing mechanism is a phase array.

68. The filter of claim 66 further comprising a reflector formed in the planar waveguide for returning the different wavelength signals from the spatial light modulator to the central pathway.

69. The filter of claim 68 in which the wavelength dispersing mechanism realigns the different wavelength signals in a direction of propagation from the individual planar pathways to the common planar pathway.

70. The filter of claim 69 including a common input and output connected to the common pathway.

71. An optical filter for a wavelength division multiplexing system comprising:

a wavelength dispersing system that (a) receives an input beam having a range of wavelengths conveying a plurality of different wavelength channels and (b) spatially separates the range of wavelengths including the different wavelength channels of the input beam; and a spatial light modulator that differentially affects the wavelengths of the input beam depending on the wavelengths' spatial positions, wherein:

the wavelength dispersing system provides for realigning the differentially affected wavelengths into a common output beam; and the spatial light modulator attenuates wavelengths between the channels for improving signal-to-noise ratios in the output beam.

72. The filter of claim 71 further comprising a spectral monitor that distinguishes optical power among the different wavelength channels, and a controller that receives the optical power information from the spectral monitor and adjusts the spatial light modulator to achieve a predetermined power distribution among the different wavelength channels in the output beam.

73. The filter of claim 71 further comprising an array of amplifiers that amplify the different wavelength channels as a function of the channels' spatial positions.

* * * * *